Sept. 22, 1970  L. A. MACIULA ETAL  3,529,724
HYDROCYCLONE FILTER
Filed Sept. 10, 1969  3 Sheets-Sheet 2
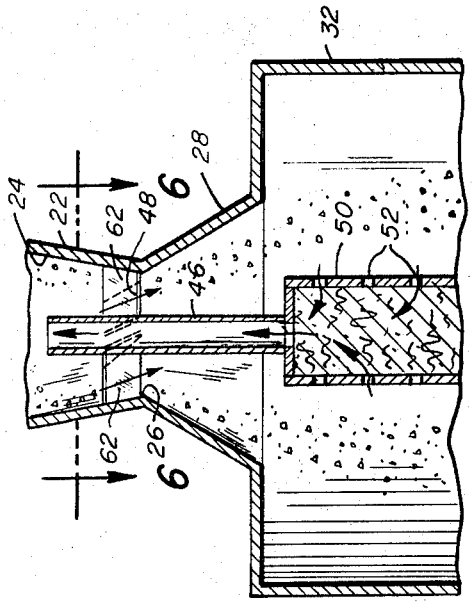
FIG. 6
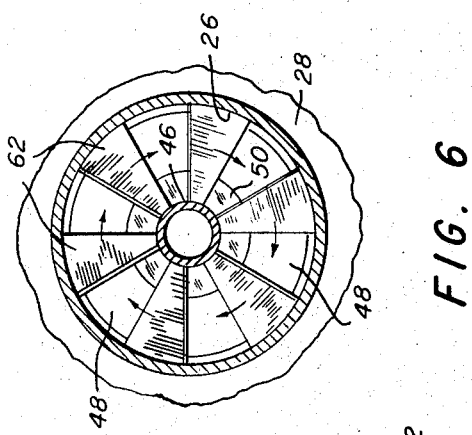
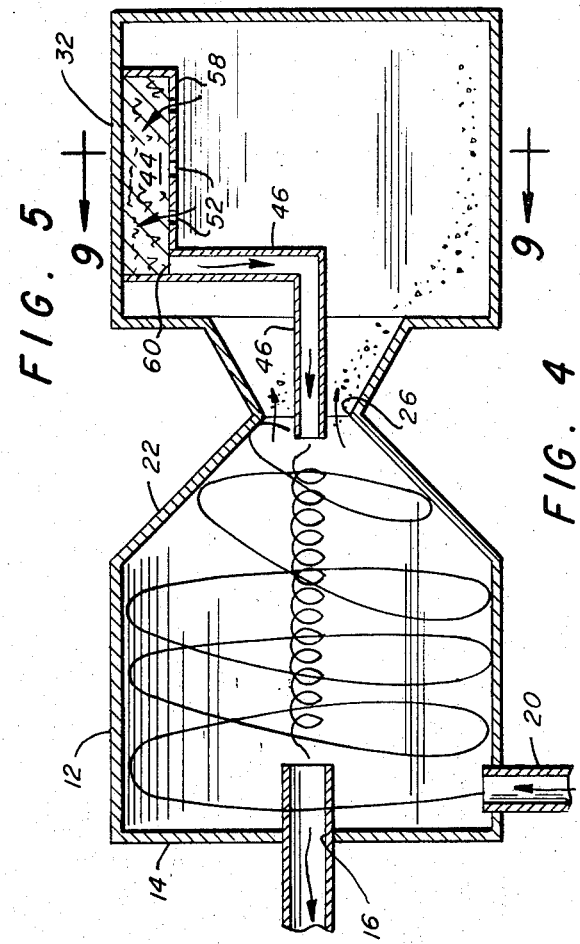
FIG. 5
FIG. 4
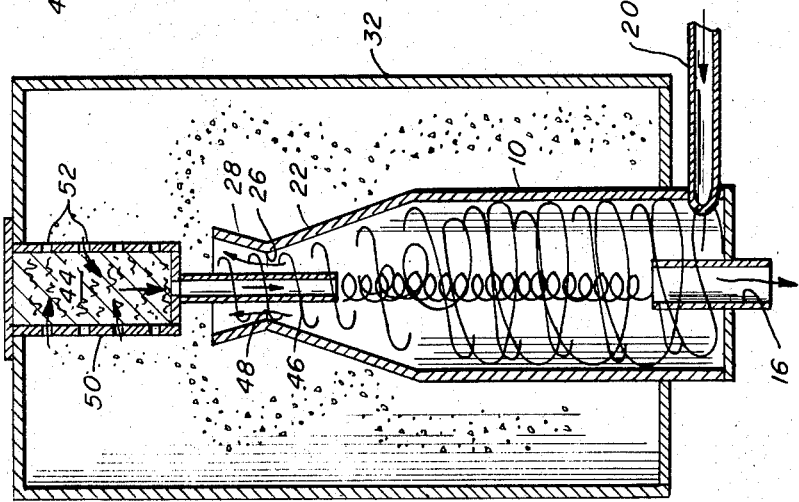
FIG. 3
INVENTORS.
L. ANDREW MACIULA
ROBERT E. REED
BY
*Head & Johnson*
ATTORNEYS

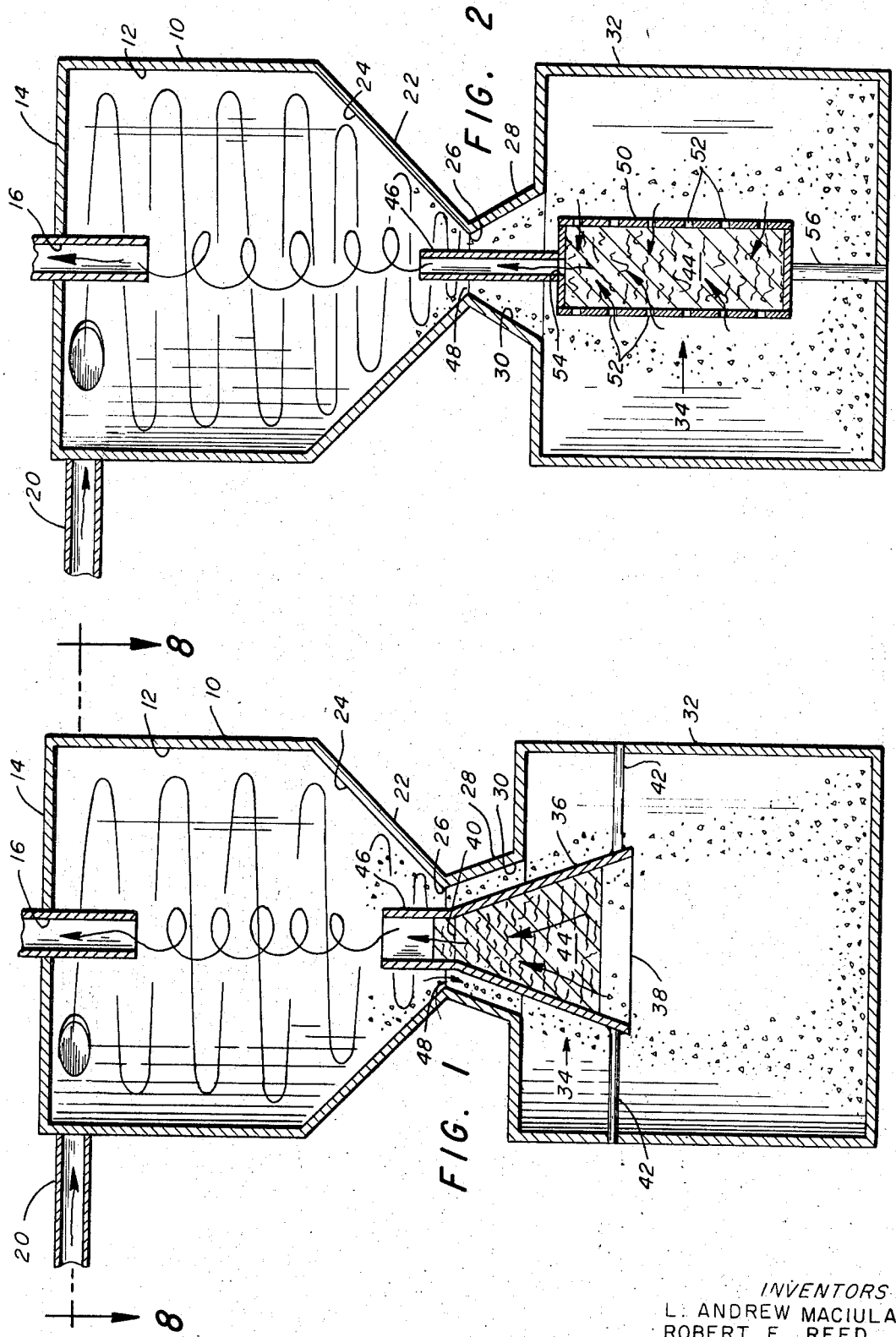

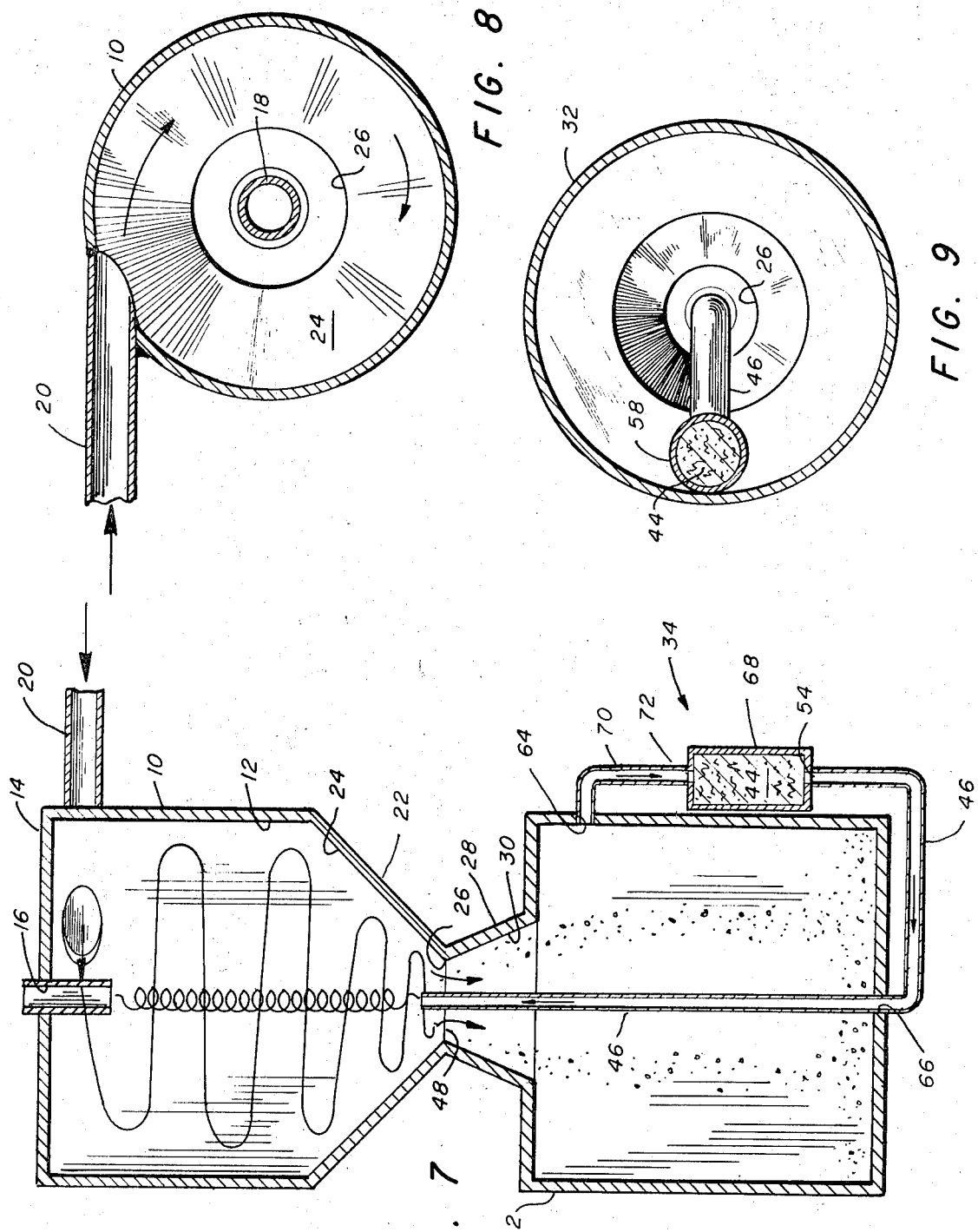

United States Patent Office 3,529,724
Patented Sept. 22, 1970

1

3,529,724
HYDROCYCLONE FILTER
L. Andrew Maciula and Robert E. Reed, Stillwater, Okla., assignors to Oklahoma State University, Stillwater, Okla., a corporation of Oklahoma
Filed Sept. 10, 1969, Ser. No. 856,771
Int. Cl. B01d 50/00; B04c 9/00
U.S. Cl. 210—197       13 Claims

ABSTRACT OF THE DISCLOSURE

This invention relates to a Hydroclone filter for the improved effectiveness of Hydroclone separating devices. More particularly, the invention relates to a Hydroclone for separation of solid contaminate particles from fluid medium including a cylindrical portion having an axial clean fluid outlet opening and a tangential fluid inlet opening, a conical portion coaxial with the cylindrical portion tapering to a reduced diameter vortical opening, an enlarged diameter collection chamber communicating with the conical portion through the vortical opening, a barrier filter means, and means of flowing fluid from the interior of the collection chamber through the barrier filter and returning the fluid from the barrier filter to the interior of the conical portion.

CROSS REFERENCE

This application is not related to any pending United States or foreign application.

BACKGROUND AND OBJECTS OF THE INVENTION

The use of cyclonic devices for separating entrained solid particles from a fluid medium is well known. While such devices are referred to by various names, those particularly intended to extract entrained solid particles from fluid are usually referred to as Hydroclone.

Reference may be had to the following United States patents for information as to the various features and arrangement of known Hydroclone apparatus: 955,787; 1,107,485; 1,760,705; 2,026,834; 2,146,672; 2,638,219; 2,726,767; 2,943,698; 3,214,020; 3,235,090; 3,259,246; and 3,339,350.

The basic concept by which a Hydroclone functions is relatively simple. Fluid is forced into a cylindrical enclosure and caused to flow in an outer circuitous path. Fluid migrates from this outer circuitous path toward the interior where it is withdrawn through a central opening. Since the fluid migrates in a direction opposite the radial centrifugal forces in the whirling fluid, heavier elements are left to the outside while clean fluid passes to the interior and out of the Hydroclone through a central upper opening. The denser components remaining in the outer circumference of the whirling fluid are passed downwardly and out of the Hydroclone through a lower opening. The provision of a conical configuration in the lower portion of the Hydroclone increases the effectiveness of separation of the entrained contaminants from the fluid medium.

It has been learned that the effectiveness of the Hydroclone device can be increased by the provision of a relatively large volume receptacle or collection chamber positioned in communication with the conical portion of the Hydroclone. The conical portion tapers to a reduced diameter vortical opening with the collection chamber having communication with the vortical opening. Ideally, a quantity of fluid flows through the vortical opening sufficient to carry all of the contaminate particles which have been ejected by centrifugal force into the peripheral surface of the conical portion downwardly into the collection chamber. If the collection chamber is closed there must be an upward flow of fluid from the collection chamber through the vortical opening equal to the downward flow of fluid at the peripheral surfaces of the vortical opening. This cross-current flow affords opportunity for a portion of the contaminant to be carried back upwardly into the interior of the conical and cylindrical portions and outwardly into the clean fluid outlet, thus reducing the effectiveness of the Hydroclone. The function of the collection chamber is to afford a relatively quiescent zone in which reduced fluid flow velocities afford the contaminate particles a chance to settle out. Those particles which do not settle out in the collection chamber are easily carried by the fluid flow from the collection chamber back up through the vortical opening and into the interior of the Hydroclone.

This invention provides a means of eliminating the possibility of carrying contaminate particles from the collection chamber back into the interior of the Hydroclone to thereby provide a Hydroclone having highly improved effectiveness in the removal of contaminate particles.

It is thus a general object of the invention to provide a more effective Hydroclone for removing contaminate particles from fluid medium.

A more specific object of this invention is to provide a Hydroclone having a barrier filter including an arrangement for filtering fluid flow from the collection chamber portion of the Hydroclone into the interior of the Hydroclone to extract any solid particles contained in such return fluid flow.

These general objects as well as other objects of the invention will be understood by reference of the description and claims taken in conjunction with the drawings.

DESCRIPTION OF THE VIEWS

FIG. 1 is a cross-sectional view of a Hydroclone according to this invention showing one embodiment of the arrangement of an intenal barrier filter means.

FIG. 2 is a cross-sectional view of a Hydroclone as shown in FIG. 1 and showing an alternate embodiment of the internal filter.

FIG. 3 is a cross-sectional view of an inverted Hydroclone including an arrangement wherein the collection chamber surrounds the other Hydroclone components.

FIG. 4 is a cross-sectional view of still an additional embodiment of the invention including the arrangement of an internal filter and showing a horizontally positioned Hydroclone.

FIG. 5 is an enlarged cross-sectional view of the portion of a Hydroclone of this invention including the vortical opening and showing the provision of vane elements in the vortical opening.

FIG. 6 is a cross-sectional view showing the vane elements as taken along the lines 6—6 of FIG. 5.

FIG. 7 is a cross-sectional view of an alternate embodiment of a Hydroclone according to this invention in which the barrier filter portion is located exteriorly of the other Hydroclone components.

FIG. 8 is a cross-sectional view taken along the line 8—8 of FIG. 1.

FIG. 9 is a cross-sectional view taken along the line 9—9 of FIG. 4.

DETAILED DESCRIPTION

Referring first to FIGS. 1 and 8, an embodiment of the Hydroclone of this invention is shown. The Hydroclone includes a cylindrical portion 10 providing a cylindrical interior surface 12. The cylindrical portion 10 is closed at one end 14, the closed end having an axial clean fluid outlet opening 16 therein. Positioned in outlet opening 16 is a downwardly extending vortex finder tube 18 by which the clean fluid passes outwardly from the interior of the Hydroclone.

Fluid bearing solid contaminate particles is introduced into the interior of cylindrical portion 10 through a fluid inlet 20 which tangentially intersects the interior cylindrical surface 12.

A conical portion 22 is affixed to the cylindrical portion 10 at the end thereof opposite the closed end 14, the conical portion 22 defining an internal conical surface 24 which is coincident at one end with the internal cylindrical surface 12 of cylindrical portion 10. The conical surface 24 tapers to a reduced diameter vortical opening 26.

In the preferred arrangement of the invention, as illustrated in all the views although not imperative to the operation of the invention, there is provided a subcone portion 28 providing a conical surface 30 extending in increased internal diameter away from the vortical opening 26. The subcone portion 28 is coaxial with the conical portion 22 and cylindrical portion 10.

An enlarged diameter collection chamber 32 is supported relative to the cylindrical portion 10, conical portion 22, subconical portion 28, and is in fluid communication with the interior of the cylindrical portion 10 and conical portion 22 through subconical portion 28 and vortical opening 26. It can be seen that if the subconical portion 28 is not utilized the collection chamber 32 communicates with the interior of the cylindrical portion 10 and conical portion 22 directly through the vortical opening 26. The configuration of the collection chamber 32 is not critical to the invention. The description of the Hydroclone up to this point may be said to be of standard construction.

Positioned within the interior of collection chamber 32, and generally indicated by the numeral 34, is a barrier filter means. In FIG. 1 the barrier filter means is in the form of a conically configured filter body 36 having a larger opened end 38 and a smaller opened end 40. The filter body 36 is supported within the collection chamber 32 such as by means of spaced support rods 42. The larger opened end 38 of the filter body 36 communicates with the interior of the collection chamber 32. Positioned within filter body 36 is barrier filter material 44. Small opened end 40 of the filter body 36 is positioned within the Hydroclone conical portion 22 or preferably in the arrangement shown, a fluid return portion 46, extending from filter body 36, and is coaxially received in vortical opening 26.

Thus there is provided between the exterior of fluid return tube portion 46 and vortical opening 26 an annular passageway 48 through which fluid bearing contaminants forced to the exterior by the circular rotation of the fluid within the cylindrical portion 10 and conical portion 22 passes downwardly and into the collection chamber 32. Return fluid flow passes upwardly through the opened end 38 of filter body 36, through barrier filter material 44, small diameter opening 40, and return tube 46 into the interior of the conical portion 22. The return fluid which flows through return tube portion 46 is passed upwardly with the other clean fluid and out through the vortex finder 18.

FIG. 2 shows an alternate embodiment of the barrier filter means 34. Here there is provided a cylindrical configured filter body 50 having the barrier filter material 44 therein. The filter body 50 includes apertures 52 by which fluid can flow from the interior of the collection chamber 32 into the interior of the filter body. The cylindrical filter 50 has a small diameter opening 54 at one end which communicates with the fluid return tube 46. A rod 56 supports the filter body 50 within the collection chamber 32.

FIG. 3 shows an inverted Hydroclone according to this invention wherein the collection chamber 32 substantially surrounds the cylindrical portion 10, conical portion 22, and subconical portion 28 of the Hydroclone. The cylindrical filter body 50, as previously described with reference to FIG. 2, is positioned within the collection chamber 32 and includes fluid return tube portion 46 as previously described.

FIGS. 4 and 9 show an arrangement wherein the Hydroclone is positioned horizontally. In this arrangement filter body 58, having perforations 52 therein, is attached to the inside wall of the collection chamber 32. The fluid return tube 46 extends from an opening 60 in the filter body 58 and in an L-shaped arrangement passes axially through vortical opening 26 to terminate interiorly of the Hydroclone conical portion 26 as previously described.

FIGS. 5 and 6 show an additional alternate embodiment including a plurality of spaced apart vane members 62 positioned between the exterior of the fluid return tube portion 46 and the vortical opening 26. In the preferred arrangement the vane members 62 are planar elements inclined relative to the axis of the fluid return conduit 46 in the direction of downward fluid flow through the annular space 48. The inclined vane members 66 take advantage of fluid rotation present in the Hydroclone to force the particles separated by centrifugal forces into the collection chamber 32 and maintain a mechanical barrier that prevents mixing and returning of such separated particles to the interior of the conical or cylindrical portions.

FIG. 7 discloses an additional alternate embodiment in which the filter means 34 is positioned exteriorly to the other Hydroclone components. In this arrangement the collection chamber 32 has a first small diameter opening 64 and a second small diameter opening 66. The barrier filter means includes a filter housing 68 exterior of the other Hydroclone components. The filter housing 68 has a first small diameter opening 54 therein which communicates with one end of the fluid return tube 46. The fluid return tube 46 extends through opening 68 in collection chamber 32 and through the vortex opening 26, terminating axially within the interior of the conical portion 22. A contaminated fluid outlet flow conduit 70 communicates with first opening 64 in the collection chamber 32 and a fluid inlet opening 72 in filter housing 68.

OPERATION

Refinements in the design of the Hydroclones used for separation of solids from liquids, heavier liquids from lighter liquids, solids from air, liquids from air, as well as any other combination of two or more materials of different weight, mass or shape, has led to the use of the closed collection chamber system. In the use of the closed collection chamber system gravity is normally relied upon to complete the separation; however, recent developments in hydraulics and other sophisticated systems require a degree of cleanliness far and above that which could be expected to settle by gravity. Although the Hydroclone may separate these particles and deliver them to the closed collection chamber, an equal amount of fluid must return to the system. If the returned fluid contains materials in the category of small particles retained in indefinite suspension due to fluid viscosity, etc., the net efficiency of the Hydroclone system is reduced. This invention combines the characteristics of a Hydroclone that can continue to separate as long as storage space is available with the unsurpassed ability of a barrier filter to remove materials from a system which may be in suspension. This combination increases the capacity of the barrier filter substantially by selectively separating in the barrier filter only those particles not otherwise separated by the Hydroclone. Only a very small portion of the fluid being cleaned passes through the barrier filter. If a barrier filter alone is required to handle full flow and all particles are forced into the filter media by high flow rates and pressures a build-up of contaminant in the media occurs. In this invention the flow through the barrier is at a very low rate and at very low pressures, precluding firm anchoring of contaminate particles in the filter media, thereby allowing filtered material to easily drop off into the collection chamber, thus prolonging the filter life indefinitely.

This invention utilizes the basic characteristic of a Hydroclone to provide necessary energy to drive a controlled amount of liquid through the filter media. By the system of this invention the barrier filter can be small and very dense because only a small portion of fluid is filtered. In a normal filter system the barrier filter would have to be much larger and would require frequent replacement to accomplish comparable results.

In the interest of larger storage and easy replacement, it will be desirable in some instances to build inverted units such as shown in FIG. 3 with the filter element at the top and sludge storage on the sides and at the bottom. This arrangement is particularly effective on operations that start and stop periodically since contaminant build-up on the barrier filter will have an opportunity to slough off when flow is stopped.

In the practice of this invention the control of the amount of fluid passing through the barrier filter 34 becomes important in order to gain full advantage of long life of the system. Too much flow through the barrier filter creates problems inherent and well known in barrier filters; too little reduces Hydroclone efficiency. This flow rate can be controlled by the annular area 48 surrounding the return flow tube 46 in conjunction with filter resistance and the inside diameter of the return flow tube 46. The annular area 48 must be compatible with particle sizes being removed. The minimum possible size of annular area 48 increases the unit separation efficiency by providing a natural pressure drop across the annular area 48 thereby forcing the particles separated by the centrifugal forces of the Hydroclone into the collection chamber 32 without any possibility of being returned to the clean fluid vortex by drag forces. A further embodiment of this invention is to accomplish this same result by use of sloping louvers or vanes 62 arranged in the manner of a multiblade propeller to take advantage of force rotation present in the Hydroclone to force the particles separated by the centrifugal forces into the collection chamber 32. The vanes maintain a mechanical barrier that prevents mixing and returning to clean stream any particles once delivered to the collection chamber. The flow rate is controlled by pressure drop through barrier filter 34 and return flow tube 46 allowing liberal tolerance between vanes 62, thereby reducing cost of expensive fabrication inherent in maintaining close tolerance annular area 48 to achieve similar results. This embodiment also minimizes the possibility of plugging by making larger openings possible.

While the invention has been described with a certain degree of particularity it is manifest that many changes may be made in the details of construction and the arrangement of components without departing from the spirit and scope of this disclosure. As an example, the expression "barrier filter" as used herein is intended to include all filters of the type depending upon contact of fluid flowing through a filter medium.

What is claimed:

1. A hydrocyclone for the separation of solid contaminate particles suspended in a fluid medium comprising:
    a cylindrical portion defining a cylindrical interior surface, the cylindrical portion being closed at one end, the closed end having an axial clean fluid outlet opening therein, the cylindrical portion having a fluid inlet tangentially intersecting said interior cylindrical surface;
    a conical portion coaxial with said cylindrical portion, the conical portion defining an internal conical surface coincident at one end with the internal cylindrical surface of said cylindrical portion and tapering to a reduced diameter vortical opening;
    a collection chamber, the interior of which communicates with the interior of said conical portion through said vortical opening; and
    a barrier filter means having a fluid communication with said collection chamber and including a clean fluid conduit portion extending coaxially through said vortical opening and terminating coaxially within said conical portion.

2. A hydrocyclone according to claim 1 including:
    a subcone portion between said conical portion and said collection chamber providing an internal conical surface coaxial with said internal conical surface of said conical portion, said conical surface of said subconical portion expanding in increased internal diameter away from said vortical opening, said barrier filter means fluid conduit portion extending coaxially through said subcone portion and said vortical opening and terminating coaxially within said conical portion.

3. A hydrocyclone according to claim 1 wherein said barrier filter means includes:
    a conically configured filter body having a larger and a smaller open end, the filter body being positioned within said collection chamber coaxially with said conical portion and having the larger open end thereof within said collection chamber, and including barrier filter material positioned within said filter body, the smaller open end thereof being positioned within said hydrocyclone conical portion.

4. A hydrocyclone according to claim 1 wherein said barrier filter means includes:
    a cylindrical configured filter body positioned within said collection chamber, coaxially with said conical portion, the filter body being closed at one end and having a small diameter opening in such closed end, and including a clean fluid conduit portion communicating at one end with said small diameter opening and extending coaxially through said vortical opening and terminating open ended within said conical portion, the end of said filter body opposite said closed end being open permitting fluid flow therein and including barrier filter material positioned within said filter body.

5. A hydrocyclone according to claim 4 in which said filter body is perforated.

6. A hydrocyclone according to claim 1 including:
    a plurality of spaced apart vane members between said clean fluid conduit portion and said conical portion vortical opening.

7. A hydrocyclone according to claim 6 in which said vane members each are planar elements inclined relative to the axis of said clean fluid conduit in the direction of downward fluid flow in the annulus between said vortical opening and said clean fluid conduit.

8. A hydrocyclone according to claim 1 wherein said barrier filter means includes:
    a filter housing supported to the interior surface of said collection chamber and having said clean fluid conduit communicating therewith, the filter housing having perforations therein and including barrier filter material positioned in the filter housing.

9. A hydrocyclone according to claim 1 wherein said collection chamber has a first and second opening therein and wherein said barrier filter means includes a filter housing exteriorly of said collection chamber, said clean fluid conduit portion being received in the first of said openings in said collection chamber, and including a contaminated outlet flow conduit communicating at one end thereof with the interior of said collection chamber through the second of said openings, the other end of said contaminated outlet flow conduit communicating with the filter housing, and including barrier filter material in said filter housing.

10. A hydrocyclone for the separation of solid contaminate particles suspended in a fluid medium comprising:
- a cylindrical portion defining a cylindrical interior surface, the cylindrical portion being closed at one end, the closed end having an axial clean fluid outlet opening therein, the cylindrical portion having a fluid inlet tangentially intersecting said interior cylindrical surface;
- a conical portion coaxial with said cylindrical portion, the conical portion defining an internal conical surface coincident at one end with the internal cylindrical surface of said cylindrical portion and tepering to a reduced diameter vortical opening;
- an enlarged diameter collection chamber communicating with said cylindrical portion and said conical portion through said vortical opening;
- a barrier filter means; and
- means of flowing fluid from the interior of said collection chamber through said barrier filter and returning the fluid to the interior of said cylindrical portion.

11. A hydrocyclone according to claim 10 wherein said barrier filter is interior of said collection chamber.

12. A hydrocyclone according to claim 10 wherein said barrier filter is exterior of said collection chamber.

13. A hydrocyclone according to claim 10 wherein said means of flowing fluid from said barrier filter includes a clean fluid conduit means having one end communicating with said barrier filter and having the other end portion coaxially received in said vortical opening, and terminating within the interior of said conical portion.

References Cited

UNITED STATES PATENTS

| 2,010,435 | 8/1935 | Martheson | 210—512 X |
| 3,235,090 | 2/1966 | Bose et al. | 210—512 |
| 3,259,246 | 7/1966 | Stavenger | 210—512 X |
| 3,334,516 | 8/1967 | Cedrone | 210—512 X |

JAMES L. DE CESARE, Primary Examiner

U.S. Cl. X.R.

209—211; 210—304, 311, 512